United States Patent
Jung et al.

(10) Patent No.: US 7,512,293 B2
(45) Date of Patent: Mar. 31, 2009

(54) HEADER-REPLACEABLE HYBRID WAVEGUIDE SENSOR

(75) Inventors: Soo Jin Jung, Suwon-si (KR); Il Kweon Joung, Ansan-si (KR); Dong Ho Shin, Seoul (KR); Won Hoe Koo, Seoul (KR); Gwan Su Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/896,309

(22) Filed: Aug. 30, 2007

(65) Prior Publication Data

US 2008/0056641 A1   Mar. 6, 2008

(30) Foreign Application Priority Data

Aug. 30, 2006   (KR) .................. 10-2006-0082883

(51) Int. Cl.
   *G02B 6/26* (2006.01)
(52) U.S. Cl. .............. 385/12; 385/14; 385/49; 385/129; 385/50
(58) Field of Classification Search ............. 385/12, 385/14, 49, 50, 52, 129
See application file for complete search history.

(56) References Cited

U.S. PATENT DOCUMENTS

| 2006/0146332 | A1* | 7/2006 | Lin et al. | 356/445 |
| 2007/0196067 | A1* | 8/2007 | Lee et al. | 385/131 |
| 2008/0056640 | A1* | 3/2008 | Koo et al. | 385/12 |
| 2008/0138571 | A1* | 6/2008 | Sazio et al. | 428/131 |

FOREIGN PATENT DOCUMENTS

JP   2003-207691   7/2003

* cited by examiner

*Primary Examiner*—Frank G Font
*Assistant Examiner*—James P Hughes

(57) ABSTRACT

A header-replaceable hybrid waveguide sensor comprises a header coupling section including a dielectric layer having an optical signal input section and an optical signal output section formed in one end thereof, the dielectric layer having two lines of protrusions formed on the upper surface thereof; and a polymer layer formed on and under the dielectric layer; and a sensor header including a dielectric layer having a protrusion formed on the upper surface thereof and a predetermined size of thin metal film provided therein; a polymer layer formed on and under the dielectric layer and having an opening formed in a portion corresponding to the thin metal film, the opening having a larger width than the thin metal film; and a receptor layer formed on the upper surface of the dielectric layer exposed by the opening.

7 Claims, 3 Drawing Sheets

[FIG. 1]
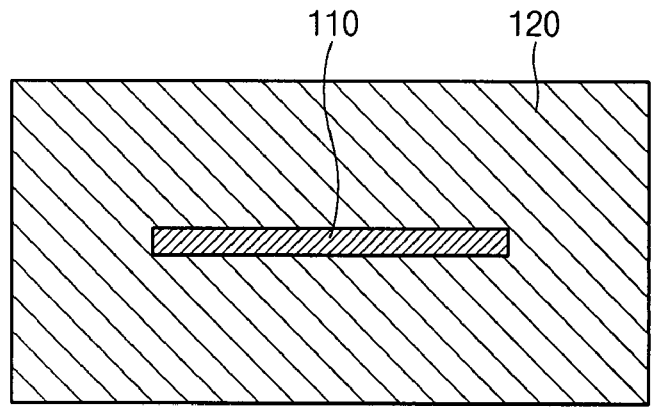
[FIG. 2]
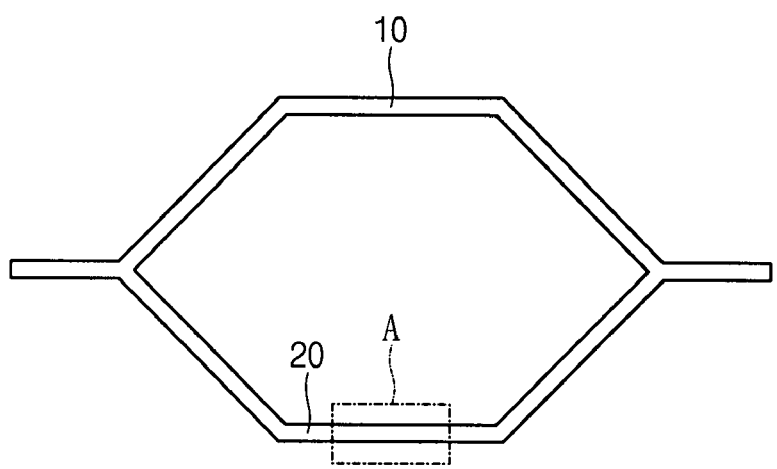
[FIG. 3]
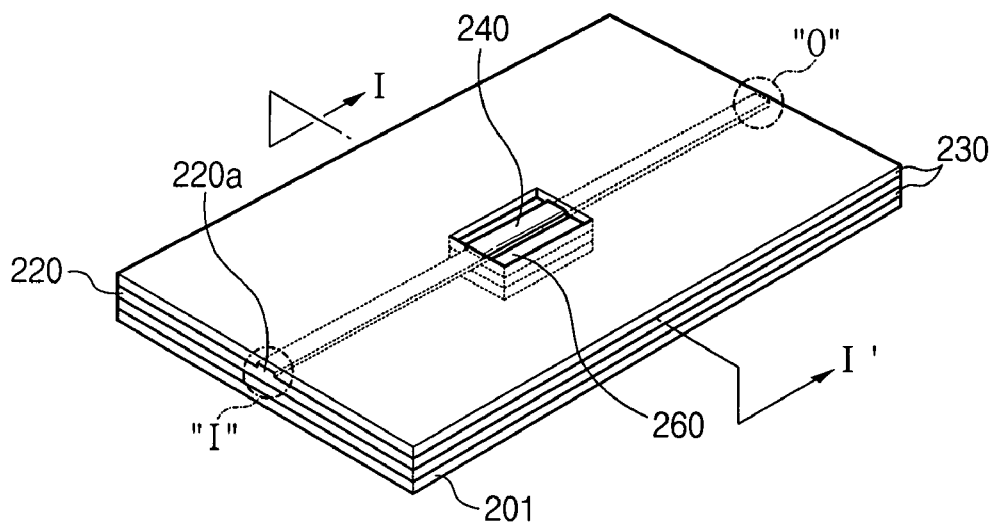

[FIG. 4]
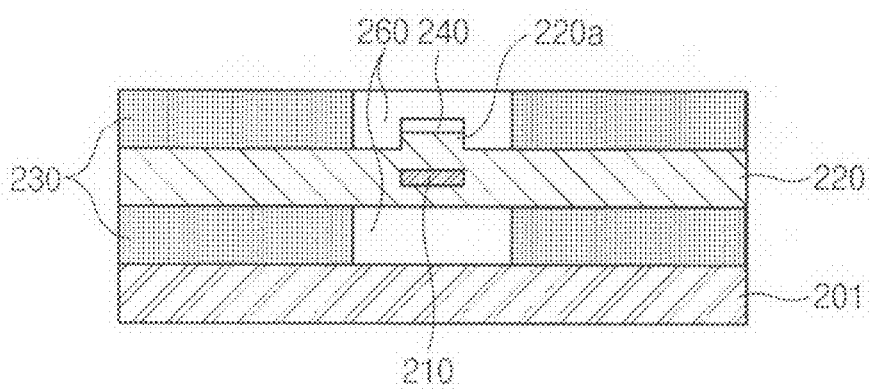
[FIG. 5A]
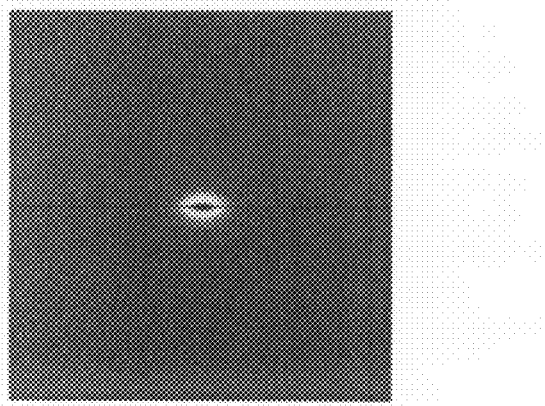
[FIG. 5B]
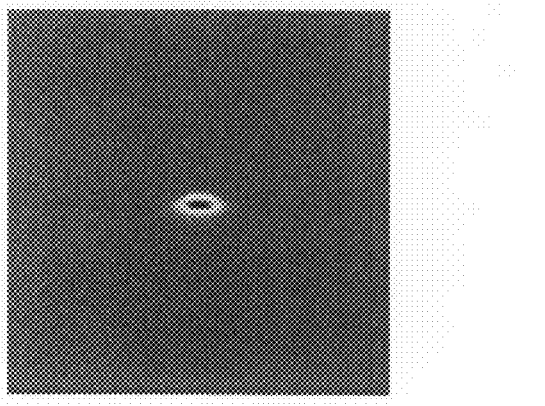

[FIG. 6]
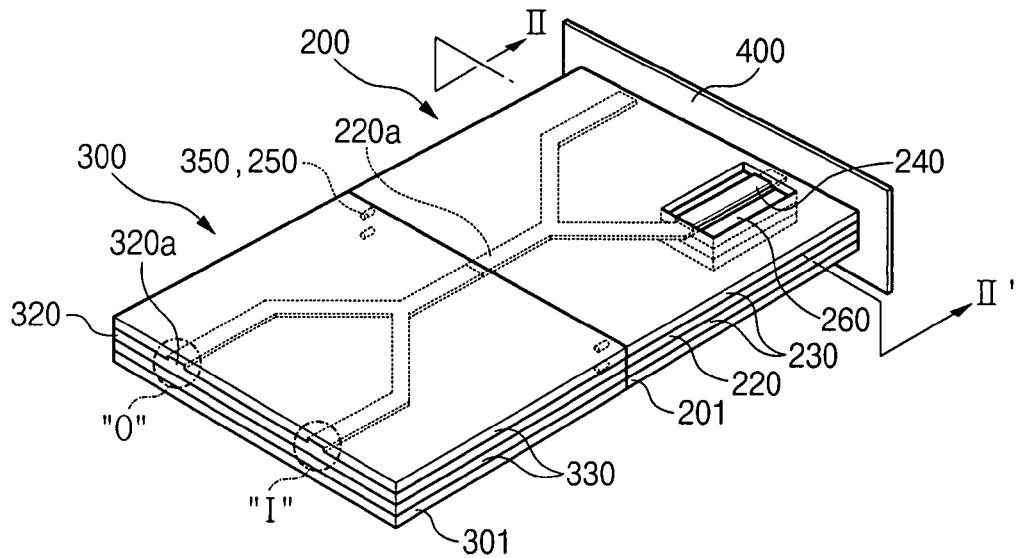
[FIG. 7]
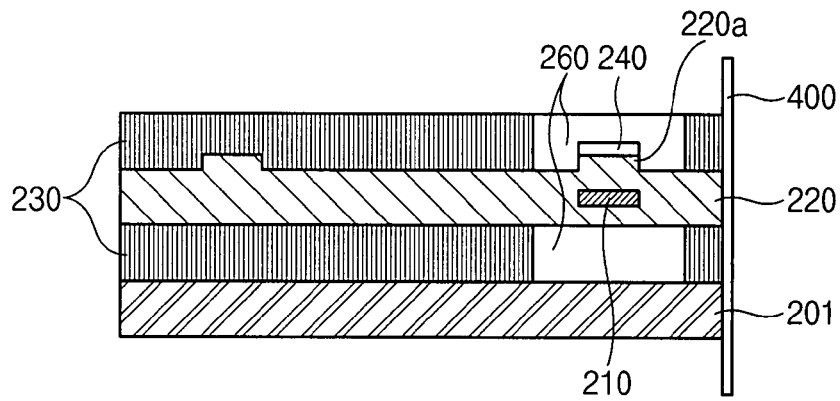
[FIG. 8]
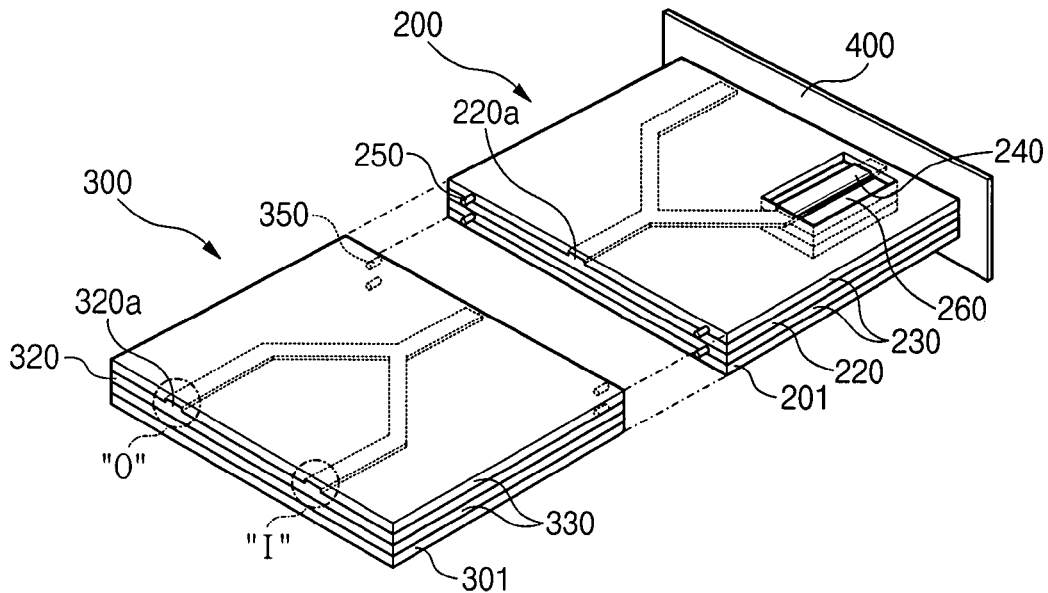

HEADER-REPLACEABLE HYBRID WAVEGUIDE SENSOR

CROSS-REFERENCE TO RELATED APPLICATIONS

This application claims the benefit of Korean Patent Application No. 10-2006-0082883 filed with the Korea Intellectual Property Office on Aug. 30, 2006, the disclosure of which is incorporated herein by reference.

BACKGROUND OF THE INVENTION

1. Field of the Invention

The present invention relates to a header-replaceable hybrid waveguide sensor in which a detachable header having a receptor mounted thereon can be separated. When the lifetime of the receptor ends, the header can be replaced so that the same level of sensitivity can be maintained at all times.

2. Description of the Related Art

As the environment changes and is polluted, a need for environmental sensors, bio-sensors, and gas sensors gradually increases. Particularly, there is a need for such a sensor that is much more sensitive and is small enough to carry.

The development of sensors has been continued for dozens of years. Among a variety of techniques which have contributed to the development of sensors, the technique for optical sensors has been significantly developed. Particularly, sensors using surface plasmons (SP) have more excellent sensitivity than the other sensors. Therefore, the sensors using surface plasmons are being actively manufactured.

Surface plasmons are charge-density oscillations which propagate along an interface between materials with dielectric constants having a reverse sign. In general, surface plasmons exist at the interface between metal having the negative sign and a dielectric having the positive sign, and can be excited by electrons accelerated at high speed and optical waves. Electromagnetic waves which are coupled to surface plasmons so as to propagate are referred to as surface plasmon polarions (hereinafter, referred to as "SPP").

Since the wave vector of the surface plasmon is larger than those of surrounding materials, the SPP is bound to a metal surface. Therefore, the interface between metal and a dielectric can be considered as a two-dimensional optical waveguide.

In view of the optical waveguide, SPPs to be generated at the interface between metal and a dielectric are effectively bound to the metal surface, while a propagation distance thereof is as short as dozens of mm in a visible-ray region. However, when the thickness of metal is limited to several nm to dozens of nm such that SPPs propagating at the interface is coupled to each other, long-range transmission of light can be implemented. These are referred to as long-range surface plasmon polariton (LR-SPP) modes. The field profile of the LR-SPP modes is widely distributed in a dielectric around a thin metal film. Therefore, a propagation loss of light is small, and a coupling characteristic with optical fiber is excellent. Accordingly, the LR-SPP modes are applied to various optical elements.

Hereinafter, a conventional metal waveguide using LR-SPP modes and a conventional waveguide sensor using the same will be described with reference to FIGS. 1 and 2.

FIG. 1 is a sectional view of a conventional metal waveguide using LR-SPP modes.

Referring to FIG. 1, the conventional metal waveguide includes a core composed of metal 110 of which the cross-section has a predetermined thickness and width and which is formed in a strip shape; and a dielectric 120 surrounding the core. The entire structure of the waveguide may be also formed in a strip shape.

Such a conventional waveguide couples light to the metal 110 such that SPP waves propagate in the longitudinal direction of the metal 110. In this case, since the metal 110 has a predetermined thickness and width of cross-section in a direction perpendicular to the propagation direction of the SPP waves, the SPP waves can be two-dimensionally bound, which makes it possible to implement a waveguide using LR-SPP modes.

FIG. 2 is a plan view of a conventional waveguide sensor using the waveguide shown in FIG. 1.

As shown in FIG. 2, the waveguide shown in FIG. 1 is constructed as an MZI (Mach-Zehnder Interferometer) type waveguide. Then, a reference signal is applied to one arm 10, and a substance to be measured is caused to interact with the waveguide in the second arm 20 such that a phase shift generated by receiving a modulated signal is detected. Then, it is possible to sense a type or concentration of the substance.

When the entire core of the above-described waveguide is formed of metal such that the waveguide can be utilized as a sensor using the reaction of a sensing substance with the surface of the metal, high sensitivity can be obtained because of the reaction of the metal. However, an overall propagation loss is large.

In order to solve such problems, sensors using a waveguide are developed and used. In the conventional waveguide sensor, however, a sensing section and optical signal input and output sections are integrally formed. Therefore, as the frequency of use increases, the sensitivity of the sensing section decreases. Accordingly, the sensing section and the optical signal input and output sections should be all replaced.

As a result, a replacement cost of the sensor in which the sensing section and the optical signal input and output sections are integrally formed increases so that economical efficiency is significantly degraded.

SUMMARY OF THE INVENTION

An advantage of the present invention is that it provides a header-replaceable hybrid waveguide sensor in which a detachable header having a receptor mounted thereon can be separated. When the lifetime of the receptor ends, the header can be replaced so that the same level of sensitivity can be maintained at all times.

Additional aspect and advantages of the present general inventive concept will be set forth in part in the description which follows and, in part, will be obvious from the description, or may be learned by practice of the general inventive concept.

According to an aspect of the invention, a header-replaceable hybrid waveguide sensor comprises a header coupling section including a dielectric layer having an optical signal input section and an optical signal output section formed in one end thereof, the dielectric layer having two lines of protrusions formed on the upper surface thereof; and a polymer layer formed on and under the dielectric layer; and a sensor header including a dielectric layer having a protrusion formed on the upper surface thereof and a predetermined size of thin metal film provided therein; a polymer layer formed on and under the dielectric layer and having an opening formed in a portion corresponding to the thin metal film, the opening having a larger width than the thin metal film; and a receptor layer formed on the upper surface of the dielectric layer exposed by the opening.

Preferably, the protrusions of the header coupling section are individually formed in a line at the optical signal input section and the optical signal output section, respectively, which are formed in one end of the dielectric layer, and then join each other at a predetermined position, thereby forming one line of protrusion at the other end of the dielectric layer.

Preferably, the protrusion of the sensor header formed in a line at one end of the dielectric layer diverges into two lines at a predetermined position toward the other end thereof.

Preferably, the protrusion formed on the dielectric layer of the sensor header passes over the thin metal film.

Preferably, the sensor header has a mirror surface provided thereon.

Preferably, the receptor layer is closely attached on the upper surface of the protrusion of the dielectric layer at a length corresponding to the thin metal film, the upper surface of the protrusion being exposed through the opening of the polymer layer provided in the sensor header.

Preferably, the sensor header has coupling projections formed at a coupling end thereof where one line of protrusion of the dielectric layer originates, and the sensor coupling section to which the sensor header is coupled has coupling grooves formed at a corresponding end thereof.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a sectional view of a conventional metal waveguide using LR-SPP modes;

FIG. 2 is a plan view of a conventional waveguide sensor using the waveguide shown in FIG. 1;

FIG. 3 is a perspective view of a hybrid waveguide sensor according to an embodiment of the invention;

FIG. 4 is a sectional view taken along I-I' line of FIG. 3;

FIGS. 5A and 5B are diagrams showing simulations of mode shape in a metal waveguide and a dielectric waveguide;

FIG. 6 is a perspective view of a header-replaceable hybrid waveguide sensor according to the invention when a header is coupled;

FIG. 7 is a sectional view taken along II-II' line of FIG. 6; and

FIG. 8 is a perspective view of the header-replaceable hybrid waveguide sensor when the header is separated.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, a hybrid waveguide sensor according to the present invention will be described in detail with reference to FIGS. 3 to 5.

FIG. 3 is a perspective view of a hybrid waveguide sensor according to the invention, and FIG. 4 is a sectional view taken along I-I' line of FIG. 3.

As shown in FIGS. 3 and 4, the hybrid waveguide sensor includes a dielectric layer 220 having one optical signal input section I formed in one end thereof, one optical signal output section O formed in the other end thereof, and a predetermined size of thin metal film 210 formed therein.

On and under the dielectric layer 220, a polymer layer 230 is formed, the polymer layer 230 having an opening 260 formed to expose a portion of the dielectric layer 230 corresponding to the thin metal film 210. The opening 260 has a larger width than the thin metal film 210. The polymer layer 220 including the thin metal film 210 and the dielectric layer 220 is formed on a substrate 201.

The dielectric layer 220 has a protrusion 220a provided on the upper surface thereof, the protrusion 220a being formed in a line which connects the optical signal input section I at one end of the dielectric layer 220 and the optical signal output section O at the other end of the dielectric layer 220. Preferably, the protrusion 220a is formed to pass over the thin metal film 210.

On the protrusion 220a of the dielectric layer 220, which is exposed by the opening 260 so as to correspond to the thin metal film 210, a receptor layer 240 is formed.

A metal waveguide portion composed of the thin metal film 210 and the dielectric layer 220 formed on and under the thin metal film 210 serves as a sensing part. The other portions excluding the sensing part, that is, portions of the protrusion 220a where the thin metal film 210 is not formed and portions of the dielectric layer 220 formed thereunder serve as a dielectric waveguide part.

In the waveguide sensor shown in FIG. 3, the metal waveguide using the thin metal film 210 is used as the sensing part, in order to overcome low sensitivity of an existing dielectric waveguide. However, when the overall structure is constructed by the metal waveguide, there can be a limit in propagation length because of a large propagation loss. Therefore, the sensing part is constructed by the metal waveguide composed of the thin metal film 210 and the dielectric layer 220 surrounding the thin metal film 210, and the other portion is constructed by the dielectric waveguide composed of the dielectric layer 220.

As such, in the hybrid waveguide sensor of the invention, the other portion excluding the sensing part is constructed by the dielectric layer 220, where a propagation loss is small, so as to guide input/output beams. The sensing part is constructed by the metal waveguide including the thin metal film 210. Therefore, the hybrid waveguide sensor can have excellent sensitivity due to the surface plasmon polariton (SPP) properties of the metal waveguide.

FIGS. 5A and 5B are diagrams showing simulations of mode shape in the metal waveguide and the dielectric waveguide.

In the present invention, the respective mode shapes are similar to each other, as shown in FIGS. 5A and 5B. Therefore, it is possible to reduce a coupling loss at both ends of the sensor.

In this case, the size and shape of mode can be varied in accordance with the width and thickness of the thin metal film 210 and the shape of the dielectric waveguide.

In the hybrid optical waveguide sensor of the invention, the receptor layer 240 exposed by the opening 260 and formed on the dielectric layer 220 above the thin metal film 210 is exposed to a substance which is to be measured. A change when a substance to be measured reacts with the receptor layer 240 can be checked by measuring a propagation loss between input and output, which is caused by the interaction with SPP modes to be generated in the thin metal film 210.

That is, when a substance to be measured reacts with the receptor layer 240 formed in the sensing part, an external refractive index around the receptor layer 240 changes, and the substance on the metal waveguide including the thin metal film 210 changes in thickness. At this time, the SPP modes in the thin metal film 210 interact with the change in substance, thereby having an effect on a change in intensity of light. Then, the changes in refractive index and thickness can be measured by measuring the change in intensity of light.

As the hybrid waveguide sensor is constructed in such a manner, the intensity of light to be incident can be maintained at the maximum. A large difference in intensity in accordance with the substance reaction in the thin metal film 210 can be obtained. Further, a propagation loss can be minimized in the dielectric waveguide part such that a signal with changed intensity is obtained at the maximum.

Further, the thicknesses and dielectric constants of substances can be adjusted depending on a necessary function. Therefore, the waveguide can be optimized into a waveguide having a necessary function. Further, the structure of the waveguide is simple, which makes it possible to facilitate sensor array construction.

Meanwhile, a header-replaceable hybrid waveguide sensor according to the invention will be described in detail with reference to FIGS. 6 to 8. However, the descriptions of the same portions of the hybrid waveguide sensor which has been described above will be omitted.

FIG. 6 is a perspective view of a header-replaceable hybrid waveguide sensor according to the invention when the sensor is coupled to a header. FIG. 7 is a sectional view taken along II-II' line of FIG. 6. FIG. 8 is a perspective view of the header-replaceable hybrid waveguide sensor when the header is separated.

As shown in the drawings, the header-replaceable hybrid waveguide sensor is roughly divided into a sensor header 200 and a header coupling section 300. The header coupling section 300 is additionally installed in a separate sensor body (not shown) or a measuring product such that the sensor header 200 can be attached/detached, if necessary.

The header coupling section 300 includes a dielectric layer 320 having an optical signal input section I and an optical signal output section O formed in one end thereof and a polymer layer 330 formed on and under the dielectric layer 320.

The dielectric layer 320 of the header coupling section 300 has two lines of protrusions 320a formed on the upper surface thereof. The protrusions 320a are individually formed in a line at the optical signal input section I and the optical signal output section O, respectively, which are formed in one end of the dielectric layer 320. However, the protrusions join each other at a predetermined position, thereby forming one line at the other end of the dielectric layer 320.

The header coupling section 300 has a pair of coupling grooves 350 formed in both sides of the protrusion 320a formed in one line at the other end of the dielectric layer 320. The coupling grooves 350 are formed in the polymer layer 330 on and under the dielectric layer 320.

The sensor header 200 to be mounted on the header coupling section 300 includes a dielectric layer 220 having a predetermined size of thin metal film 210 provided therein; a polymer layer 230 formed on and under the dielectric layer 220 and having an opening formed in a portion corresponding to the thin metal film 210, the opening 260 having a larger width than the thin metal film 210; and a receptor layer 240 formed on the upper surface of the dielectric layer 220 exposed by the opening 260.

The dielectric layer 220 of the sensor header 200 has a protrusion 220a formed on the upper surface thereof. The protrusion 220a formed in a line at one end of the dielectric layer 220 diverges into two lines at a predetermined position such that two lines of protrusions 220a are formed at the other end of the dielectric layer 220. Preferably, one line of protrusion 220a is formed to pass over the thin metal film 210.

The header-replaceable waveguide sensor according to the invention has a mirror surface 400 formed in the other end of the dielectric layer 220 provided in the sensor header 200.

The receptor layer 240 is closely attached to the upper surface of the protrusion 220a of the dielectric layer 220 exposed through the opening of the polymer layer 230.

At the coupling end of the sensor header 200 where the protrusion 220a of the dielectric layer 220 formed in a line originates, coupling projections 250 are formed at positions corresponding to the coupling grooves 350 of the sensor coupling section 300.

As described above, the header-replaceable waveguide sensor has the optical signal input section I and the optical signal output section O formed in one side surface of the sensor coupling section 300 and the sensor header 200 coupled to the other side surface of the sensor coupling section 300, the sensor header 200 having the mirror surface 400. Therefore, a signal applied to the optical signal input section I is reflected by the mirror surface 400, and the reflected signal is measured by the optical signal output section O.

According to the header-replaceable waveguide sensor of the invention, the sensor header having a mirror mounted thereon is detachably constructed. Therefore, when the lifetime of a receptor of the sensor header ends, the sensor header can be replaced any time, in order to maintain sensitivity of the receptor. Therefore, the SPP property of the metal waveguide can be optimally maintained so that excellent sensitivity can be obtained. Further, since only a sensor header is replaced, it is possible to reduce a cost.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A header-replaceable hybrid waveguide sensor comprising:
    a header coupling section including:
        a dielectric layer having an optical signal input section and an optical signal output section formed in one end thereof, the dielectric layer having two lines of protrusions formed on the upper surface thereof; and
        a polymer layer formed on and under the dielectric layer; and
    a sensor header including:
        a dielectric layer having a protrusion formed on the upper surface thereof and a predetermined size of thin metal film provided therein;
        a polymer layer formed on and under the dielectric layer and having an opening formed in a portion corresponding to the thin metal film, the opening having a larger width than the thin metal film; and
        a receptor layer formed on the upper surface of the dielectric layer exposed by the opening.

2. The header-replaceable hybrid waveguide sensor according to claim 1,
    wherein the protrusions of the header coupling section are individually formed in a line at the optical signal input section and the optical signal output section, respectively, which are formed in one end of the dielectric layer, and then join each other at a predetermined position, thereby forming one line of protrusion at the other end of the dielectric layer.

3. The header-replaceable hybrid waveguide sensor according to claim 1,
wherein the protrusion of the sensor header formed in a line at one end of the dielectric layer diverges into two lines at a predetermined position toward the other end thereof.

4. The header-replaceable hybrid waveguide sensor according to claim 1,
wherein the protrusion formed on the dielectric layer of the sensor header passes over the thin metal film.

5. The header-replaceable hybrid waveguide sensor according to claim 1,
wherein the sensor header has a mirror surface provided thereon.

6. The header-replaceable hybrid waveguide sensor according to claim 1,
wherein the receptor layer is closely attached on the upper surface of the protrusion of the dielectric layer at a length corresponding to the thin metal film, the upper surface of the protrusion being exposed through the opening of the polymer layer provided in the sensor header.

7. The header-replaceable hybrid waveguide sensor according to claim 1,
wherein the sensor header has coupling projections formed at a coupling end thereof where one line of protrusion of the dielectric layer originates, and the sensor coupling section to which the sensor header is coupled has coupling grooves formed at a corresponding end thereof.

* * * * *